(12) United States Patent
Natsume

(10) Patent No.: US 6,493,277 B2
(45) Date of Patent: Dec. 10, 2002

(54) DATA GENERATION CIRCUIT AND METHOD FOR DATA GENERATING

(75) Inventor: Kenichi Natsume, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 28 days.

(21) Appl. No.: 09/836,421

(22) Filed: Apr. 18, 2001

(65) Prior Publication Data

US 2001/0042156 A1 Nov. 15, 2001

(30) Foreign Application Priority Data

Apr. 19, 2000 (JP) .................................. 2000-117989

(51) Int. Cl.[7] ............................................... G11C 7/00
(52) U.S. Cl. .......................... 365/189.12; 365/189.01; 365/233
(58) Field of Search ..................... 365/189.12, 189.01, 365/233, 240

(56) References Cited

U.S. PATENT DOCUMENTS 5,151,791 A * 9/1992 Moriyama et al. .......... 358/426
5,509,663 A * 4/1996 Otake et al. ................ 273/437
5,537,230 A * 7/1996 Chiba et al. ................ 358/521
5,608,424 A * 3/1997 Takajashi et al. ........... 345/141

FOREIGN PATENT DOCUMENTS

JP          08167865 A      6/1996

* cited by examiner

Primary Examiner—Son T. Dinh
(74) Attorney, Agent, or Firm—Volentine Francos, PLLC

(57) ABSTRACT

A data generating circuit includes a memory which writes picture data into a plurality of storage areas and reads the picture data from the plurality of storage areas according to address information. A register which hold information indicative whether the picture data has been written into each of the plurality of storage areas. A control circuit which outputs a select signal according to the storage information held by the register when the picture data is read from the memory. A selector which selects an output data read from the memory or a fixed data according to the select signal output by the control circuit.

19 Claims, 8 Drawing Sheets

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 7

| d0 | d1 | 0 | 0 | 0 | 0 | 0 | 0 |
|---|---|---|---|---|---|---|---|
| d8 | 0 | d10 | 0 | 0 | 0 | 0 | 0 |
| 0 | 0 | 0 | 0 | 0 | 0 | 0 | 0 |
| d24 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

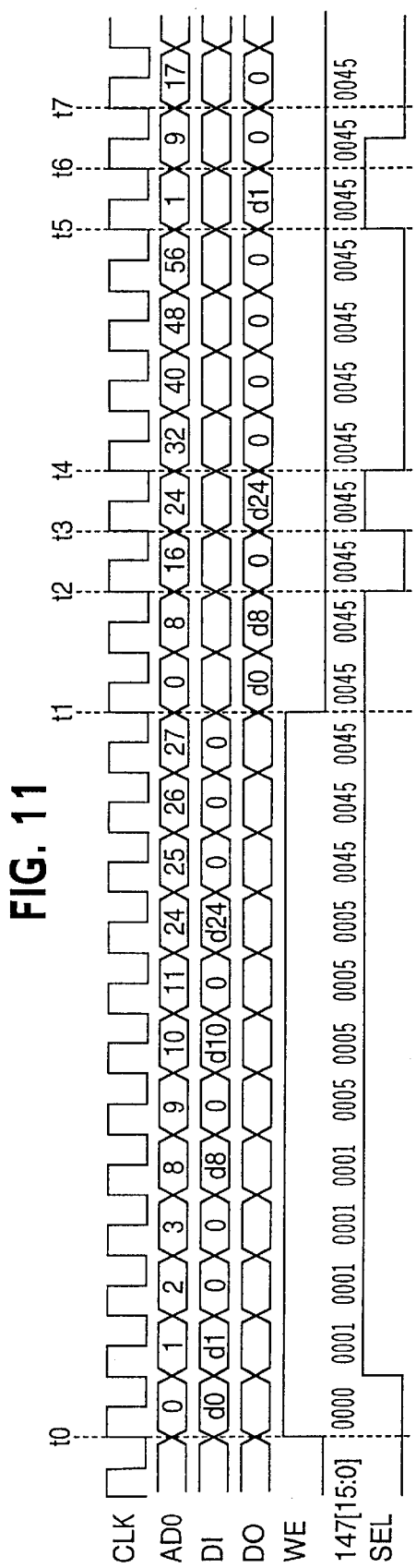

DATA GENERATION CIRCUIT AND METHOD FOR DATA GENERATING

The present application claims priority under 35 U.S.C. §119 to Japanese Application No. 2000-117989 filed on Apr. 19, 2000, which is hereby incorporated by reference its entirely for all purposes.

BACKGROUND OF THE INVENTION

1. Field of The Invention

The present invention relates to a data generation circuit which can store and read picture processing data and to a method for generating data. In particular, the present invention relates to an orthogonal transforming circuit and method.

2. Description of the Related Art

Compressing and extracting techniques are generally performed in the processing of moving picture data. Original moving picture data is compressed into a variable-length code using a coding circuit. The original moving picture data is extracted from the coded data by a decoding circuit.

The coding circuit includes a Discrete Cosine Transformation (DCT) circuit, a quantizing circuit and a variable-length coding circuit. The decoding circuit includes an Inverse Discrete Cosine Transformation (IDCT) circuit, an inverse-quantizing circuit and a variable-length code decoding circuit.

The DCT circuit and the IDCT circuit are generally called an orthogonal transforming circuit. In the orthogonal transforming circuit, for example, DCT coefficients are inverse-quantized, and inputted to the IDCT circuit as data. The data generation circuit is applied to generate data, which are inputted to such an orthogonal transforming circuit.

The data generation circuit has a memory to store and read picture processing data, such as inverse-quantized DCT coefficients data. A serial port Random Access Memory (RAM) and a dual port RAM are conventionally used as such a memory.

A unit block of the moving picture data for data processing is 8*8 pixels or 16*16 pixels, in accordance with the international standard MPEG2 (Moving Picture Image Coding Experts Group Phase 2). Therefore, the memory is divided into a plurality of storing areas. Each storing area corresponds to each pixel. Each inverse-quantized DCT coefficient corresponding to each pixel is stored in the respective storing areas. For example, a 64 word RAM is used for unit block of 8*8 pixels since each pixel must be accessible separately according to address information.

Most of the picture processing data, such as inverse-quantized DCT coefficients, which are stored in the memory of the data generation circuit, are zero-components (data equivalent to data "B"). Even though the rate of zero-components in one unit block depends on the coding method and the picture that is coded or decoded, there are still a lot of zero-components. In a conventional data generating circuit, all of the zero components are stored to the storing areas in order of scanning, and all of the zero-components are read out after the transformation in the orthogonal direction.

Power consumption is large in the conventional data generating circuit because all of the data including zero-components are written into the memory. Also, a writing period is long because the entire picture processing data is written into the memory. Therefore, the processing time is slow.

An example of an attempt to solve this problem is disclosed in the application of Japanese laid open number HEI 8-167856. In this reference, a RAM is initialized before writing, and then the data except for the zero-components are written. In addition, the data generating circuit of this reference includes a plurality of RAMs. While the picture processing data of one RAM are read out, another RAM is initialized and written to improve the processing time.

However, in the circuit of this reference, a plurality of RAMs have to be prepared and more complicated operation is required which increases manufacturing cost. If the reference technology is performed with one RAM, which would not avoid the long processing time, complex timing control is needed because the RAM has to be initialized before writing

SUMMARY OF THE INVENTION

According to one aspect of the present invention, a data generating circuit includes a memory which writes picture data into a plurality of storage areas and reads the picture data from the plurality of storage areas according to address information, a register which hold information indicative whether the picture data has been written into each of the plurality of storage areas, a control circuit which outputs a select signal according to the storage information held by the register when the picture data is read from the memory and a selector which selects an output data read from the memory or a fixed data according to the select signal output by the control circuit.

BRIEF DESCRIPTION OF THE DRAWINGS

FIG. 6 shows an image drawing of storing areas of a memory of preferred embodiments of the present invention.

FIG. 7 shows an image drawing of stored data in the memory of preferred embodiments of the present invention.

FIG. 11 shows a time chart of an operation of the second preferred embodiment of the present invention.

DETAILED DESCRIPTION OF THE PREFERRED EMBODIMENTS

The preferred embodiments are described below with reference to drawings. As an example, a data generating circuit is described as being used in a decoding circuit.

Figure 1:
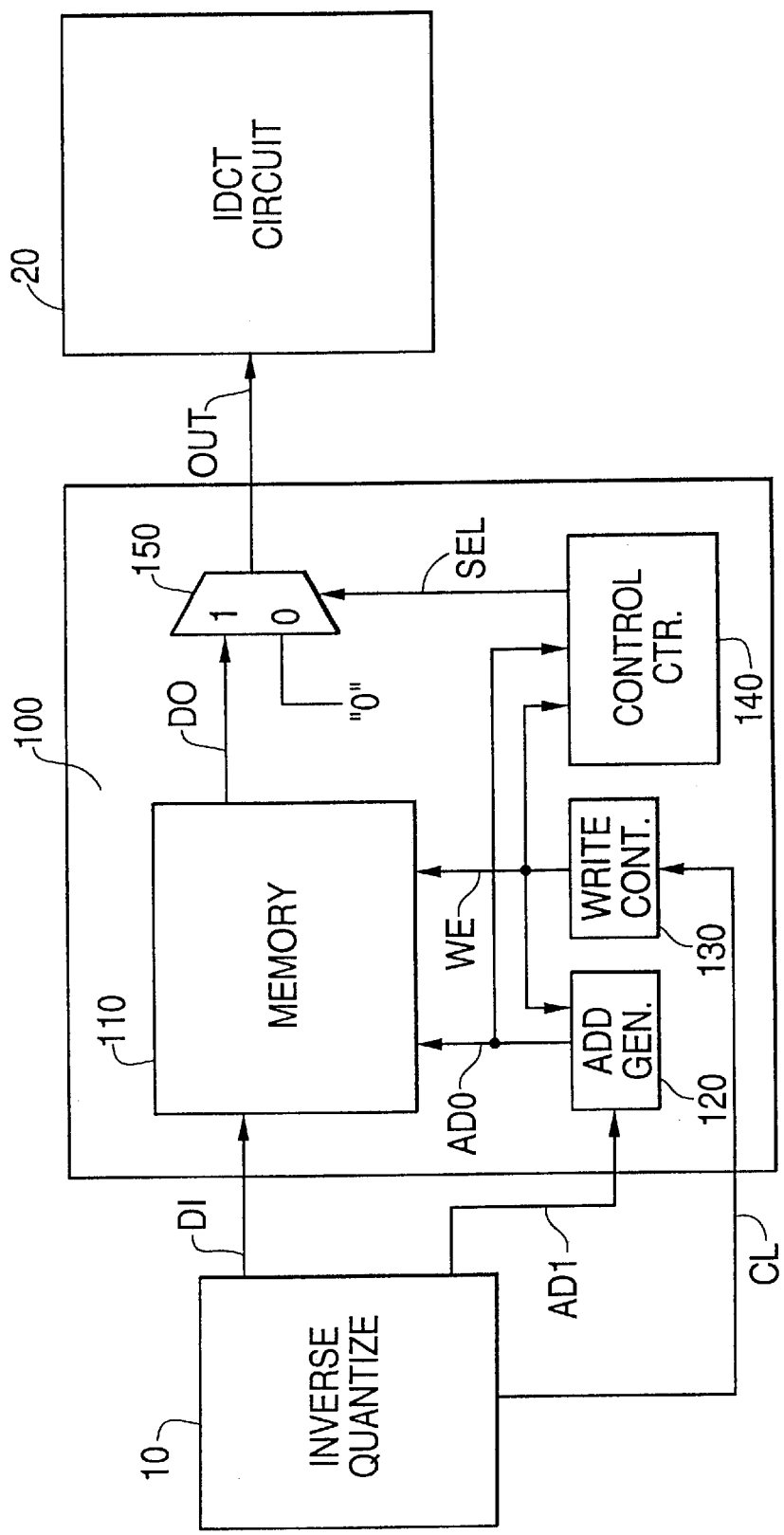
FIG. 1 is a schematic diagram of a data generating circuit of a first preferred embodiment of the present invention.

FIG. 1 is a block diagram of the data generating circuit of a first preferred embodiment. The data generating circuit 100 has a memory 110, an address generating circuit 120, a write control signal generating circuit 130, a control circuit 140 and a selector 150 as a selecting circuit.

Picture processing data DI, which are outputted from an inverse-quantized circuit 10, are inputted to the data generating circuit 100. For example, the picture processing data DI are the inverse-quantized DCT coefficients. Address information AD1 is also inputted to the data generating circuit 100 from the inverse-quantized circuit 10. The address information AD1 indicates storing areas of the memory 110 for the picture processing data DI. A control signal CL is also inputted to the data generation circuit 100 from the inverse-quantized circuit 10. The control signal CL controls the storing of the data DI. For example, the control signal CL becomes a Vcc level (an H level hereinafter) when the data DI for a picture unit block are outputted from the inverse-quantized circuit 10. The control signal CL is a ground level (an L level hereinafter) except for the above period. When the data DI are outputted from the inverse-quantized circuit 10, the data DI are written into the memory 10.

As described in more detail below, data DI from the inverse-quantized circuit 10 are not zero-components of the picture block in the present embodiment. That is, the zero-components do not have to be outputted from the inverse-quantized circuit 10. The address information AD1 corresponds to the non-zero-components DI, and the address information corresponding to the zero-components do not have to be outputted in this preferred embodiment. The data DI are inputted to the memory 110, the address information AD1 are inputted to the address generation circuit 120 and the control signal CL is inputted to the write control signal generating circuit 130.

Generation of the address information AD1 and the control signal CL is not limited to the inverse-quantized circuit 10. These signals can be outputted from other control circuits. For example, the output timing of these signals, which correspond to the output of the data DI, can be controlled by software.

The memory 110 may, for example, be a single port RAM in the first preferred embodiment. As an example, when a unit block is 8*8 pixels, a single port RAM with 64 words lines may be used in the first preferred embodiment.

Writing into the memory 110 is controlled according to a potential level of the write control signal WE. In the first preferred embodiment, the data DI are written into the memory 110 according to an address information ADO when the write control signal WE is an H level. When the write control signal is an L level, the memory 110 outputs data DO according to the address information ADO. The relationship between the storing areas of the memory 110 and the address information ADO is described later.

The address generating circuit 120 selectively outputs the address information AD1 or an address information AD2 as the address information ADO. The address information AD1 are inputted from another circuit (the inverse-quantized circuit 10 in the first preferred embodiment), and the address information AD2 are generated in the address generating circuit 120.

Figure 2:
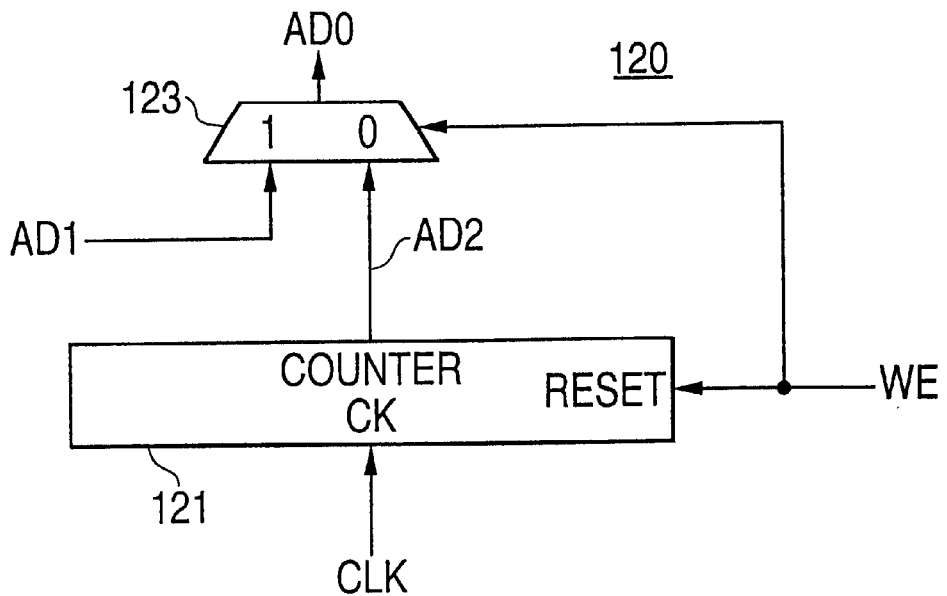
FIG. 2 is a schematic diagram of a write control circuit of the first preferred embodiment of the present invention.

FIG. 2 shows a circuit diagram of the address generating circuit 120. The address generating circuit 120 has a counter 121, which generates the address information AD2, and a selector 123.

The counter 121 is held in a reset state, when the write control signal WE is an H level. When the write control signal is an L level, the counter 121 counts up a clock signal CLK For example, the counter 121 starts counting from binary 000000, and counts up every rising of the clock signal CLK until binary 111111. The output of the counter 121 is the address information AD2.

The selector 123 selects the address information AD1 as the address information ADO when the write control signal is an H level, and selects the address information AD2 as the address information ADO when the write control signal is an L level The address generating circuit 120 outputs the address information AD1 as the address information ADO to the memory 110 when the data DI are written into the memory 110. The address generating circuit 120 outputs the address information AD2 as the address information ADO to the memory 110 when the data DO are read out from the memory 110.

The write control signal generating circuit 130 outputs the write control signal WE of an H level when the control signal CL is an H level, and outputs the write control signal WE of L level when the control signal CL is an L level. A plurality of buffers or even number of inverters can be used as the write control generating circuit 130. However, other components can be used if the relationship between the write control signal WE and the control signal CL is not changed.

The control signal CL may be supplied from other than the inverse-quantized circuit 10. For example, software may control a timing of operations. In that case, the write control signal WE can be controlled depends on a signal which controls the operation of the storing mans 110.

The data DO, which is outputted from the memory 110, are inputted to the selector 150. The data DO are inputted to a first input terminal (1-side input) of the selector 150. A fixed data "0" is inputted to another input terminal (0-side input) of the selector 150 in the preferred embodiment. The data "0" corresponds to each of the zero-components.

The selector 150 selects the data DO or the data "0" as an output data OUT according to the select signal SEL. The selector 150 selects the data "0" when the select signal SEL is an L level, and selects the data DO when the select signal SEL is An H level in the first preferred embodiment.

Figure 3:
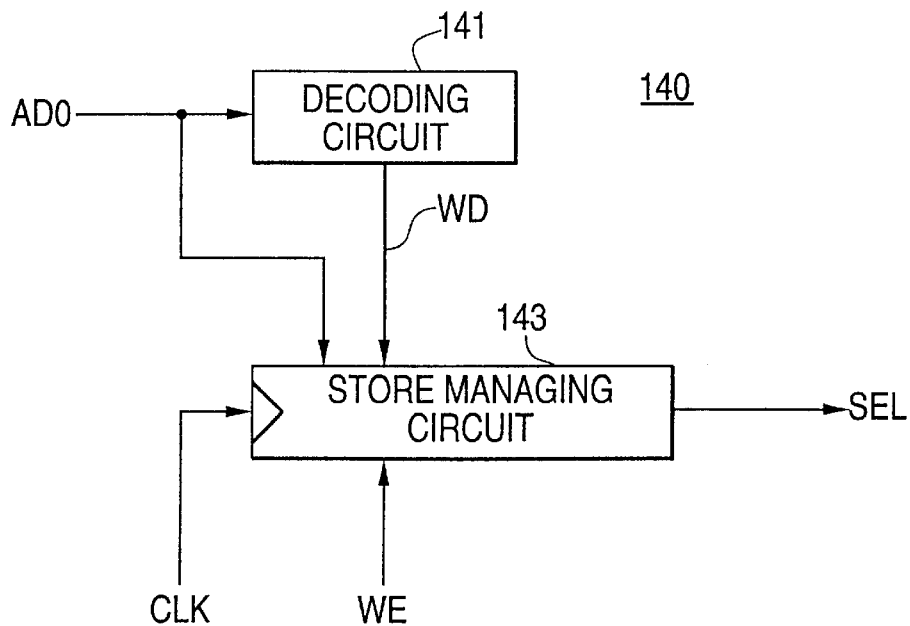
FIG. 3 is a schematic diagram of a store managing circuit of the first preferred embodiment of the present invention.

FIG. 3 shows a block diagram of the control circuit 140 which outputs the select signal SEL. The control circuit 140 has a decoding circuit 141 and a store managing circuit 143. The address information ADO are inputted to the decoding circuit 141, and the decoding circuit 141 outputs a plurality of bits of storing information WD. The storing information WD, the address information ADO and the clock signal CLK is inputted to the store managing circuit 143, and the store managing circuit 143 outputs the select signal SEL.

Figure 4:
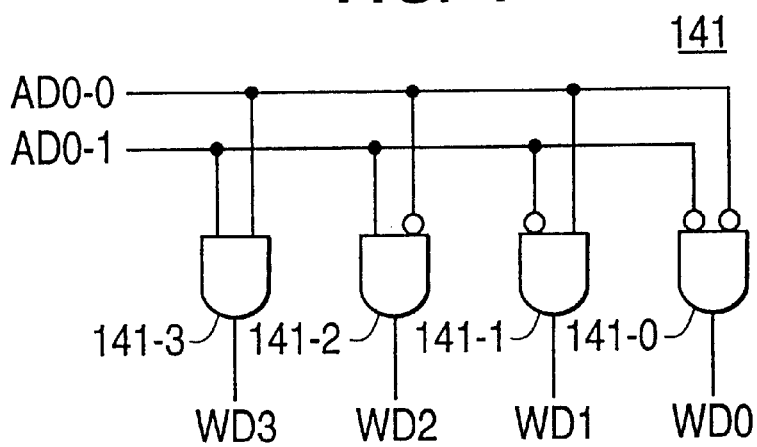
FIG. 4 is a schematic diagram of a decode circuit of the store managing circuit of the first preferred embodiment of the present invention.

FIG. 4 shows an example circuit diagram of the decode circuit 141. The decode circuit 141 of the first preferred embodiment outputs 64 bits of storing information WD according to 6 bits of the address information ADO. However, to simplify the description, FIG. 4 shows the decode circuit 141 which operates according to 2 bits of the address information ADO. A first bit of the address information is expressed ADO-0, and second bit of the address information is expressed ADO-1 in the description.

The decode circuit 141 has four AND gates 141-0~141-3. Each AND gate has two input terminals. An inverted signal of the bit ADO-0 and an inverted signal of the bit ADO-1 are inputted to the AND gate 141-0. The bit ADO-0 and the inverted signal of the bit ADO-1 are inputted to the AND gate 141-1. The inverted signal of the bit ADO-0 and the bit ADO-1 are inputted to the AND gate 141-2. The bit ADO-0 and the bit ADO-1 are inputted to the AND gate 141-3. The AND gates 141-0~141-3 output information signals WD0~WD3 according to the inputted signals. The storing information WD is composed of the information signals WD0~WD3.

The information signal WD0 is an H level, and the information signals WD1~WD3 are an L level, when the address information AD0 is binary "00" (AD0-0=0, AD0-1=0). The information signal WD1 is an H level and the information signals WD0, WD2 and WD3 are an L level when the address information AD0 is binary "01" (AD0-0=0, AD0-1=1). The information signal WD2 is an H level and the information signals WD0, WD1 and WD3 are L level when the address information AD0 is binary "10" (AD0-0=1, AD0-1=0). The information signal WD3 is an H level and the information signals WD0, WD1 and WD2 are L level when the address information AD0 is binary "11" (AD0-0=1, AD0-1=1).

As described above, the address information AD0 indicates a selected bit, and only the selected bit of the storing information WD is risen to an H level by the decode circuit 141. In the case where a block of 8*8 pixels is processed, the address information AD0 becomes binary 6 bits, and the storing information WD becomes 64 bits. The selected bit of 64 bits of the storing information WD becomes an H level according to the address information AD0.

Other structures can be applied to the decode circuit 141. For example, a circuit, which changes the selected bit of storing information WD to an H level according to the address information AD0 can be used as the decode circuit 141.

Figure 5:
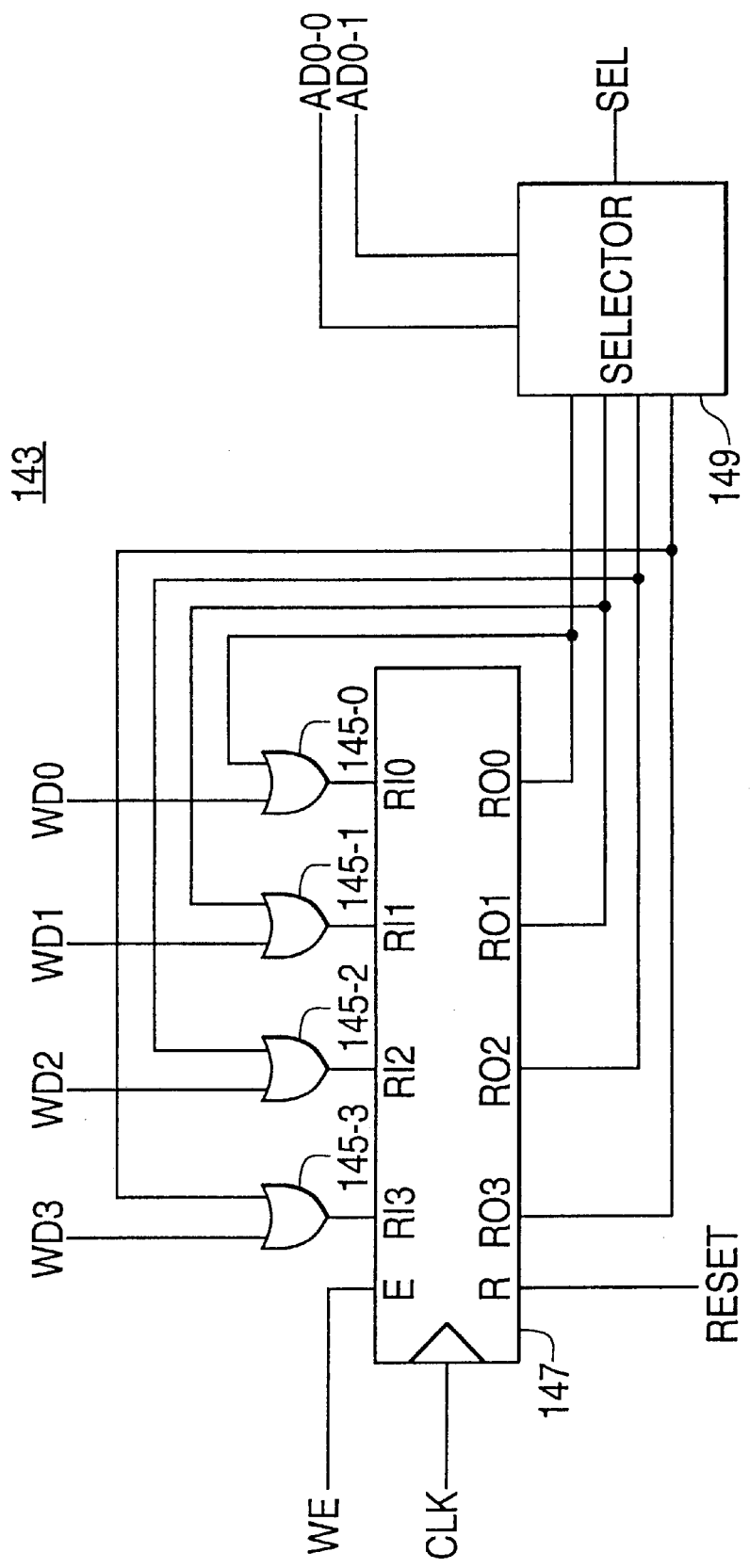
FIG. 5 is a schematic diagram of a register of the control circuit of the first preferred embodiment of the present invention.

FIG. 5 shows a circuit diagram of the store managing circuit 143 of the first preferred embodiment. The store managing circuit 143 of the first preferred embodiment operates as a 64 bit register. However, to simplify the description, FIG. 5 corresponds to the 4 bits of the storing information WD which is outputted from the decode circuit 141 of FIG. 4.

The store managing circuit 143 has four OR gates 145-0~3, a register 147 and a selector 149. Each OR gate has two input terminals and an output terminal. The register 147 can store 4 bits of data. The selector 149 selects one of the inputted 4 bits signals as the select signal SEL.

Each bit WD0~WD3 of the storing information WD is inputted to one input terminal of the OR gates 145-0~145-3, respectively. Signals which are outputted from output terminals RO0~RO3 of the register 147 are inputted to another input terminals of the OR gates 145-0~145-3 respectively. Signals which are outputted from toe OR gates 145-0~145-3 are inputted to the input terminals RI0-~RI3 of the register 147.

The write control signal WE, the clock signal CLK and a reset signal RESET is inputted to the register 147. The register 147 stores information of the input terminals RI0~RI3 according to the rising of the clock signal CLK when the write control signal WE is an H level. The register stores the information as a logic level. (H or L) The information stored in the register 147 is outputted from the output terminal RO0~RO3 respectively. When the write control signal WE is an L level, the register 147 does not store new information, and holds the stored information.

Operations of the OR gates 145-0~145-3 and the register 147 are described below using an example. At first, the information outputted from the output terminal RO0~RO3 is "0000" (all output terminals are L level), and the storing information WD, which is inputted to the register 147, is binary "0010". The storing information binary "0010" means that the information signal WD1 is an H level and the information signals WD0, WD2 and the WD3 are L level, and each information signal WD0~WD3 is inputted to the OR gates 145-0~145-3, respectively.

L level signals are inputted to one input terminals of OR gates 145-0~145-3 from the output terminals RO0~RO3, respectively. Therefore, the output signals of the OR gates 145-0~3 correspond to the storing information WD. Therefore, the output signal of OR gate 145-1 is an H level, and the output signals of the OR gates 145-0, 145-2 and 145-3 are L level. The signal inputted to the input terminal RI1 is an H level, and the signals inputted to the input terminals RI0, RI2 and RI3 are L level.

The register 147 stores information of the input terminal RI0~RI3 according to the rising of the clock signal CLK when the write control signal WE is an H level. Therefore, the outputted signal from the output terminals RO0~RO3 become "0010". The signal outputted from the output terminal RO1 is an H level, and the signals outputted from the output terminals RO0, RO2 and RO3 are L level. The stored data in the register 147 is changed according to the signals of the input terminals RI0~RI3. Therefore the outputted signals from the output terminals RO0~RO3 are changed.

Then, the storing information WD of binary "1000" is inputted to the store managing circuit 143 while the resister 147 holds information binary "0010". The information signal WD3 is an H level and the information signals WD0, WD1 and the WD2 are L level, and each information signal is inputted to the OR gates 145-0~145-3 respectively. The H level signal of the output terminal RO1 is inputted to one input terminal of the OR gate 145-1. The L level signals of the output terminals RO0, RO2 and RO3 are inputted to the OR gates 145-0, 145-2 and 145-3. The OR gate 145-1 outputs an H level with no relation to the storing information WD. The OR gates 145-0, 145-2 and 145-3 output a signal corresponding to the storing information WD. The OR gate 145-3 outputs an H level, and the OR gates 145-0 and 145-2 output L level. Therefore, the signals inputted to the input terminals RI1 and RI3 are An H level, and the signals inputted to the input terminals RI0 and RI2 are L level. This represents binary "1010".

The register 147 stores information of the input terminal RI0~RI3 according to the rising of the clock signal CLK when the write control signal WE is an H level. Therefore, the outputted signal from the output terminals RO0~RO3 becomes binary "1010". The signals outputted from the output terminals RO1 and RO3 are an H level, and the signals outputted from the output terminals RO0 and RO2 are an L level.

As, described above, the register 147 holds the storing information WD, and the stored information in the register 147 are renewed according to the new storing information WD and the former stored information in the register 147.

The register 147 is initialized when the reset signal RESET is an H level The L level signals are outputted from the output terminals RO0~RO3 after initializing. The register 147 holds stored data without initializing when the reset signal RESET is L level.

For example, if the reset signal of an H level is inputted while the information outputted from the output terminals RO0~RO3 is binary "0010", the register is initialized and outputs binary "0000" from the output terminals RO0~RO3.

The data generating circuit 100 of the preferred embodiment is reset, when the device including the data generating circuit is initialized (for example, after powered on) or when the reading out of the data from the memory 110 is complete.

The signals outputted from the output terminals RO0~RO3 and the address information ADO (ADO-0, ADO-1) are inputted to the selector 149. The selector 149 selects one of the signals from output terminals RO0~RO3 according to the address information ADO. The selector 149 outputs the select signal SEL corresponding to the selected output terminal.

The operation of the selector 149 is described below using an example. The information stored in the register 147 is binary "1010" in this example. This means that the voltage potential outputted from the output terminals RO0 and RO2 is an L level, and the voltage potential outputted from the output terminals RO1 and RO3 is an H level. When the address information ADO is binary "00" (ADO-0=0, ADO-1=0), the selector 149 selects the signal outputted from the output terminal RO0. Therefore, the selector 149 outputs the select signal SEL of L level. When the address information ADO is binary "01" (ADO-0=1, ADO-1=0), the selector 149 selects the signal outputted from the output terminal RO1. Therefore, the selector 149 outputs the select signal SEL of an H level When the address information ADO is binary "10" (ADO-0=0, ADO-1=1), the selector 149 selects the signal outputted from the output terminal RO2. Therefore, the selector 149 outputs the select signal SEL of L level When the address information ADO is binary "11" (ADO-0=1, ADO-1=1), the selector 149 selects the signal outputted from the output terminal RO3. Therefore, the selector 149 outputs the select signal SEL of an H level.

As described above, the selector 149 outputs the storing information WD, which is stored in the register 147, corresponding to the address information ADO.

The selector 149 can be composed of four AND gates, which have two input terminals and one output terminal, and one OR gate which has four input terminals and one output terminal. When the selector is composed of four AND gates and one OR gate the information signals WD0~WD3, which are outputted from decode circuit 141, is used instead of the address information ADO. That is, the information signal WD0 and the outputted signal from the output terminal RO0 is inputted to a first AND gate, the information signal WD1 and the outputted signal from the output terminal RO1 is inputted to a second AND gate, the information signal WD2 and the outputted signal from the output terminal RO2 is inputted to a third AND gate, and the information signal WD3 and the outputted signal from the output terminal RO3 is inputted to a fourth AND gate. Outputted signals from each AND gate is inputted to the OR gate, and an outputted signal of the OR gate is used as the select signal SEL. The selector 149 can be composed in various ways so long as the selector 149 outputs the storing information WD corresponding to the address information ADO.

The data DO read out from the memory 110 is inputted to a first input terminal (1-side input) of the selector 150, which is shown in FIG. 1, and the reference potential, which corresponds to the zero component, is inputted to a second input terminal (0-side input) of the selector 150. The selector 150 selects the reference potential when the select signal SEL is L level, and selects the data DO when the select signal SEL is H level. The data outputted from the selector 150 is the output data OUT.

The configurations of the circuits is described above can be changed so long as the overall operation is maintained. The operation of the data generation circuit as a whole is described below.

When the data DI from the inverse-quantized circuit 10 is stored in the data generating circuit 100, the write control signal WE becomes H level according to the control signal CL The data DI of non-zero components is inputted to the memory 110 from the inverse-quantized circuit 10. The data DI is stored in the storing area of the memory 110. The storing area is indicated by the address information ADO outputted from the address generating circuit 120. The address generating circuit outputs address information AD1 as address information ADO while writing is performed. Some of the output terminals ROx of the register 147, which is included in the store managing circuit 143, become H level when the writing is performed. The output terminals, which become H level, correspond to the address information ADO. The Above described operation is repeated until the non-zero component data DI is exhausted.

When all of the non-zero component data DI from the inverse-quantized circuit 10 is stored in the data generating circuit 100, the write control signal becomes L level according to the control signal CL.

The memory 110 outputs the stored data according to the address information ADO when read out. When the stored data is read out, the address information ADO depends on the address information AD2, which is generated by the counter 121 of the address generating circuit. Registered data in the register 147, which is included in the storing managing circuit 143, is outputted as the select signal SEL, when the read out operation is performed. Each of the output terminals ROx of the register 147 corresponds to the storing area indicated by the address information ADO. The selector 150 selects 0-side input when the select signal SEL is L level, and outputs output data OUT, which corresponds to the zero-component data, to the IDCT circuit 20. The selector 150 selects 1-side input when the select signal SEL is H level, and outputs output data OUT. The 1-side input of the selector corresponds to the data DO which is outputted from the memory 110. The data generating circuit 100 of the first preferred embodiment stores the non-zero component data DI in the memory 110, and does not store the zero-component data DI in the memory 110. Therefore, the period for writing the data DI into the memory 110 is shortened, the power consumption of the data generating circuit 100 is decreased and the operation speed is improved.

The stored data in the register 147 is reset when the reading out is finished, and the output data OUT is selected depending on the stored data. The memory 110 does not have to be reset because zero-component data, which is outputted as output data OUT, does not depend on the stored data.

The operation of the first preferred embodiment is described below in with reference to the drawings. The relationship between the address information ADO and the storing area of the memory 110 is described before describing the precise operation. FIG. 6 shows an image diagram of the storing areas of the memory 110. FIG. corresponds to a block of 8*8 pixels. As shown in FIG. 6, the memory 110 has 64 storing areas.

There are 8 storing areas in an X direction and 8 storing areas in a Y direction as shown in FIG. 6. Each area can be accessed using 6 bits of the address information ADO. For example, when the area 0 is accessed, the address information ADO becomes binary 000000, when the area 6 is accessed, the address information ADO becomes binary 000110, when the area 40 is accessed, the address information ADO becomes binary 101000, when the area 63 is accessed, the address information ADO becomes binary 111111. Upper 3 bits of the address information ADO shows a location in the Y direction, and lower 3 bits of the address information ADO shows a location in the X direction.

FIG. 7 shows an image diagram after the data DI are written in the storing areas. The data writing is described later using FIG. 8. For example, data d0, d1, d8, d10 and d24 are stored in storing areas 0, 1, 8, 10 and 24 respectively. Zero-component data are stored in other areas.

Figure 8:
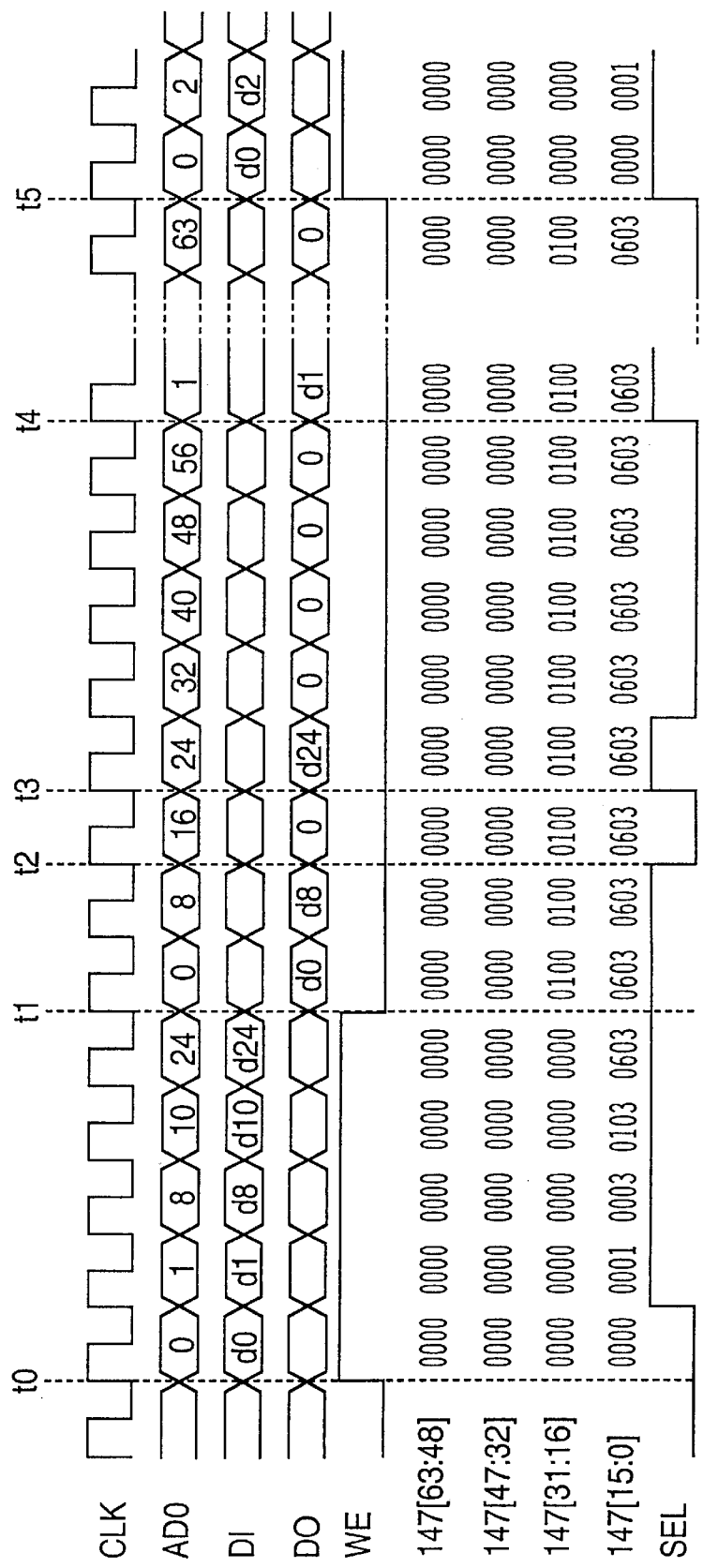
FIG. 8 shows a time chart of an operation of the first preferred embodiment of the present invention.

FIG. 8 shows a time chart of the data generating circuit of the first preferred embodiment. The decode circuit 141 of FIG. 4 outputs 64 bits of storing information WD in an example of FIG. 8. The store managing circuit 141 can store 64 bits of storing information WD in the example. The storing information WD has information signals WD0~WD63, and the register 147 has input terminals RI0~RI63 and output terminals RO0~RO63. The information stored in the register 147 is shown in FIG. 8 every 16 bits. For example, [15:0] means the information from 0 bit to 15 bit, [31:16] means the information from 16 bit to 31 bit, [47:16] means the information from 16 bit to 47 bit, [63:48] means the information from 48 bit to 63 bit. The information in the register 147 is shown as a hexadecimal number in FIG. 8. Reading out from the memory 110 starts from the storing area 0, and is performed along the direction Y. For example, an order is the area 8, the area 16, the area 24, ..., and the area 56. A second line in direction Y continues, such as the area 1, the area 9 ... the area 57. The reading out is performed from the first line to the eighth line in Y direction. This order represents an orthogonal transformation.

The potential level of the write control signal becomes an H level from the L level at time to as shown in FIG. 8. The memory 110 becomes write enable state because of the change of the write control signal WE. The write enable state continues until the write control signal becomes L level at time t1. The register 147 is in a reset state at this time t1.

The address information AD0 depends on the address information AD1 when the memory 110 is in the write enable state. The memory 110 is controlled by the control circuit 120 as shown in FIG. 2. The address information AD0 indicates the area 0 at the time t0. Therefore, the data d0, which is inputted from the data DI, is stored at the area 0. The potential level of the output terminal RO0, which corresponds to the area 0 in the register 147, becomes H level. The [15:0] of the register becomes hexadecimal 0001 because the area 0 is the minimum bit. The other bits of the register keep hexadecimal 0000. The register 147 synchronizes the clock signal CLK in this embodiment. Therefore, the [15.0] becomes hexadecimal 0001 at a second clock next to a first clock, which is the clock when the data DI is written.

Then, the data d1, which is inputted from the data DI, is stored at the area 1. The potential level of the output terminal RO1, which corresponds to the area 1 in the register 147, becomes H level. The [15:0] of the register becomes hexadecimal 0003 because the area 1 is next to the minimum bit. The other bits of the register keep hexadecimal 0000.

Then, the data d8, which is inputted from the data DI, is stored at the area 8. The potential level of the output terminal RO8, which corresponds to the area 8 in the register 147, becomes H level. The [15:0] of the register becomes hexadecimal 0103 because the area 8 is a ninth bit from the minimum bit. The other bits of the register keep hexadecimal 0000.

Then, the data d10, which is inputted from the data DI, is stored at the area 10. The potential level of the output terminal RO 10, which corresponds to the area 10 in the register 147, becomes H level. The [15:0] of the register becomes hexadecimal 0603 because the area 10 is the eleventh bit from the minimum bit. The other bits of the register keep hexadecimal 0000.

Then, the data d24, which is inputted from the data DI, is stored at the area 24. The potential level of the output terminal RO24, which corresponds to the area 24 in the register 147, becomes H level. The [31.16] of the register becomes hexadecimal 0100 because the area 1 is the 24th bit from the minimum bit. The [15:0] of the register keeps hexadecimal 0603, and the other bits of the register keep hexadecimal 0000. The data d0, d8, d10 and d24 are stored as shown in FIG. 7.

The potential level of the write control signal becomes an L level from the H level at time ti as shown in FIG. 8, and the memory 110 becomes a reading out state. Reading out state continues until the write control signal becomes H level at time t5.

The address information AD0 depends on the address information AD2 when the memory 110 of is in the reading out state. The address information AD0 indicates the area 0 at the time t1, and the data d0, which is stored at the area 0 is read out. The select signal SEL, which is outputted from the store managing circuit 143, becomes H level The select signal SEL corresponds to the output terminal RO0 of the register 147. The selector selects 1-side input according to the select signal SEL, and outputs the data do to the IDCT circuit 20 as the output data OUT.

Then, the address information AD0 indicates the area 8, and the data d8, which is stored at the area 8 is read out. The select signal SEL, which is outputted from the store managing circuit 143, becomes H level. The select signal SEL corresponds to the output terminal RO8 of the register 147. The selector 150 selects 1-side input according to the select signal SEL, and outputs the data d8 to the IDCT circuit 20 as the output data OUT.

Then, the address information AD0 indicates the area 16 at the time t2, and the data d16, which is stored at the area 16 is read out. The select signal SEL, which is outputted from the store managing circuit 143, becomes L level. The select signal SEL corresponds to the output terminal RO16 of the register 147. The data is not stored at the area 16, therefore, the output terminal RO16 is L level. The selector 150 selects 0-side input according to the select signal SEL, and outputs the zero-component data to the IDCT circuit 20 as the output data OUT.

Then, the address information AD0 indicates the area 24 at the time t3, and the data d24, which is stored at the area 24 is read out. The select signal SEL, which is outputted from the store managing circuit 143, becomes H level. The select signal SEL corresponds to the output terminal RO24 of the register 147. The selector 150 selects 1-side input according to the select signal SEL, and outputs the data d24 to the IDCT circuit 20 as the output data OUT.

The address information AD0 repeats indicating stored data. The store managing circuit 143 of FIG. 4 repeats outputting the select signal SEL corresponds to the output terminal ROx. The selector 150 selects the 1-side or 0-side input according to the select signal SEL and outputs the data DO or zero-component data to the IDCT circuit 20 as the output data OUT. For example, the address information AD0 indicates the area 1 at the time t4. The select signal SEL becomes H level.

After the data of area 63 is read out, the reading out is finished, and the reset condition is satisfied. The register 147 is reset. Then, the write control signal can becomes H level at time t5. The above described operation is repeated.

The data generating circuit of the first preferred embodiment stores the non-zero component data DI in the memory 110, and does not store the zero-component data DI in the memory 110. Therefore, the period for writing the data DI into the memory 110 is shortened, the power consumption of the data generating circuit is decreased and the operation speed is improved.

The necessary data are stored at the necessary storing areas after the reset of the register in this embodiment. The unnecessary storing areas, in which the data are not stored when writing, are not read out during reading because the selector selects zero-component data. Therefore, the data generating circuit output the stored data exactly. The data generating circuit can output zero-component data if the stored data of the memory are not initialized, because the selector 150 selects the zero-component data. Therefore, the data generating circuit does not have a plurality of RAMs, and the operation control of the plurality of RAMs. The data generating circuit can work without initializing all of the memory.

Figure 9:
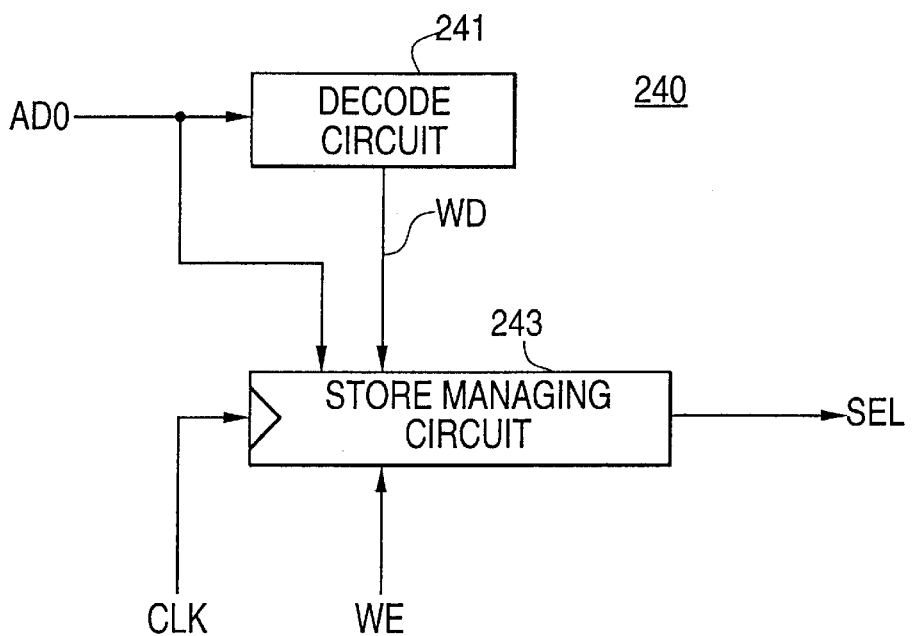
FIG. 9 is a schematic diagram of a store managing circuit of a second preferred embodiment of the present invention.

The data generating circuit of the second preferred embodiment is described below. FIG. 9 shows a circuit diagram of the control circuit 240 in the second preferred embodiment. The control circuit has the decode circuit 241 and the store managing circuit 243. The decode circuit 241 corresponds to the decode circuit 141 in FIG. 4, and the store managing circuit 243 corresponds to the store managing circuit 143 in FIG. 4. These two circuits are different from the first preferred embodiment. In the first preferred embodiment, the store managing circuit 143 can store the 64 bit of the storing information WD because each bit of the storing information WD corresponds to whether or not writing into the storing areas, which is shown in FIG. 6, is performed. The store managing circuit 243 can store the 16 bit of the storing information in the second preferred embodiment in order to reduce an area of a semiconductor chip and improve a flexibility of a chip layout.

The areas of the memory 110 as shown in FIG. 6 are treated as a plurality of groups, and a signal from the output terminal of the register 147 corresponds to a group. Four areas of the memory can be treated as a group when 16 bits register is used as the register 147. For example, the area 0~3, the area 4~7, the area 8~11, . . . and the area 60~63 are treated as a group. The 16 bits register is used as the register 147 in the second preferred embodiment. Therefore, the selector 149 selects one signal from 16 signals, which is outputted from the 147. The register 147 and the selector 149 are changed in the storing managing circuit 243. The storing managing circuit 243 has a similar structure to the storing managing circuit 143 except for the decreasing of bits of the register 147.

Figure 10:
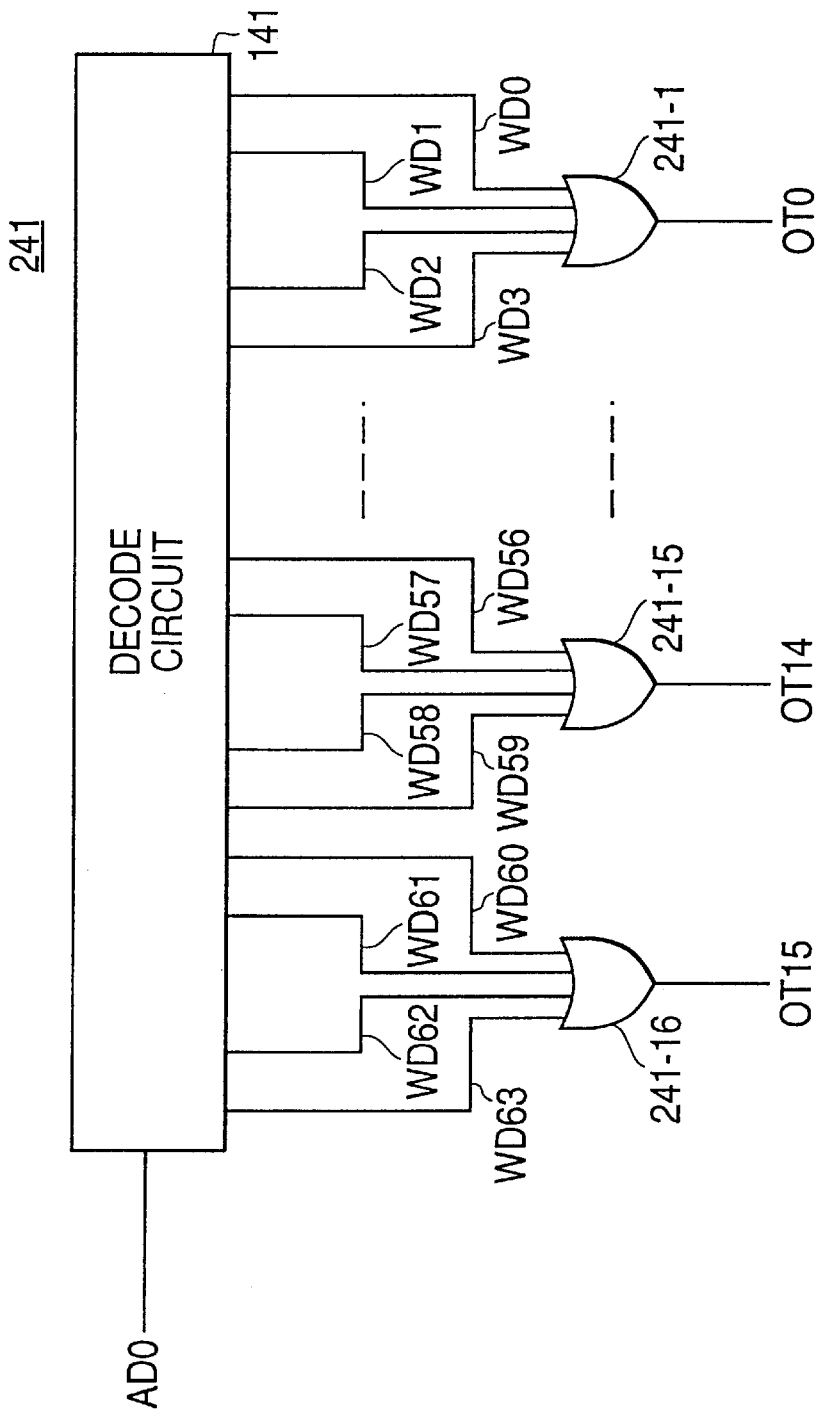
FIG. 10 is a schematic diagram of a decode circuit of the store managing circuit of the second preferred embodiment of the present invention.

The decode circuit 141 is also changed to apply the 16 bits register 147. The decode circuit 141 of the first preferred embodiment outputs 64 bits of storing information WD, however the decode circuit 241 of the second preferred embodiment outputs 16 bits of storing information WD. FIG. 10 shows a circuit diagram of the decode circuit 241. The decode circuit 241 has 16 OR gates 241-1~241-16 in addition to the decode circuit shown in FIG. 4. 16 OR gates have 4 inputs and 1 output.

For example, information signals WD0~WD3 are inputted to the OR gate 241-1, and information signals WD4~WD7 are inputted to the OR gate 241-2. Every four information signals are inputted to OR gate, and information signals WD60~WD63 are inputted to the OR gate 241-16. Four information signals correspond to each group of the memory.

The decode circuit can be composed without 16 OR gates if the combination of the inputs of the AND gate is changed. As described above, the upper 3 bits of the address information ADO shows a location in the Y direction, and the lower 3 bits of the address information ADO shows a location in the X direction. When the plurality of groups as described above is applied, each group can be distinguished using the upper four bits. The lower 2 bits are not needed to distinguish each group, therefore they can be ignored when the decode operation is performed. To decode upper 4 bits (ADO-2~ADO-5), 16 ($2^4$) AND gates are needed as described using 2 bits in the example of FIG. 4. The AND gates have 16 outputs, and these outputs are inputted to the input terminals RI of the 16 bits register, which is included in the store managing circuit 243. This structure does not need additional OR gates, and has less gates than the first preferred embodiment.

The operation of the second preferred embodiment is described below in with reference to the drawings. FIG. 11 shows a time chart of the data generating circuit of the second preferred embodiment.

The image of the storing area is the same as shown in FIG. 6 and FIG. 7. The decode circuit 241 outputs 16 bits of the storing information WD, and the storing management circuit 243 can store 16 bits of the storing information WD. The storing information WD has information signals WD0~WD15. The register 147 has 16 input terminals RI0~RI15 and 16 output terminals RO0~RO15.

The potential level of the write control signal becomes an H level from the L level at time t0 as shown in FIG. 11. The memory 110 becomes write enable state because of the change of the write control signal WE. The write enable state continues until the write control signal becomes L level at time t1. The register 147 is in a reset state at this time.

The address information ADO depends on the address information AD1 when the memory is in the write enable state. The memory 110 is controlled by the control circuit 120 shown in FIG. 2. The address information ADO indicates the area 0 at the time to, and the data d0, which is inputted from the data DI, is stored at the area 0. The address information also indicate a first group (the area 0~4). The potential level of the output terminal, which corresponds to the first group in the register 147, becomes H level. The [15:0] of the register becomes hexadecimal 0001 because the first group is the minimum bit. The other bits of the register keep hexadecimal 0000. The register 147 synchronizes the clock signal CLK in this embodiment. Therefore, the [15:0] becomes hexadecimal 0001 at the next clock after a first clock, which is the clock when the data DI is written.

Then, the data d1, which is inputted from the data DI, is stored at the area 1. The [15:0] of the register becomes hexadecimal 0001 because the area 1 is in the first group. The other bits of the register 147 keep hexadecimal 0000.

Then, the data d8, which is inputted from the data DI, is stored at the area 8. The potential level of the output terminal, which corresponds to the third group in the register 147, becomes H level. The [15:0] of the register becomes hexadecimal 0005 because the third group is a third bit from the minimum bit. The other bits of the register keep hexadecimal 0000.

Then, the zero-component data, which is inputted from the data DI, is stored at the area 9 because the address information indicates the area 9. The [15:0] of the register keeps hexadecimal 0005 because the area 9 is in the third group.

Then, the data d10, which is inputted from the data DI, is stored at the area 10 because the address information indicates the area 10. The [15:0] of the register keeps hexadecimal 0005 because the area 10 is in the third group.

Then, the zero-component data, which is inputted from the data DI, is stored at the area 11 because the address information indicates the area 11. The [15:0] of the register keeps hexadecimal 0005 because the area 11 is in the third group.

Then, the same operation is performed to the seventh group which includes nonzero-components. The [15:0] of the register becomes hexadecimal 0045 because the area 1 is the 7$^{th}$ bit from the minimum bit.

The potential level of the write control signal becomes L level from the H level at time t1 as shown in FIG. 11, and the memory 110 becomes reading out state. The reading out state continues until the write control signal becomes H level.

The address information ADO depends on the address information AD2 when the memory is in the reading out state. The memory is controlled by the control circuit 120 shown in FIG. 2. The address information ADO indicates the area 0 at the time t1, and the data do, which is stored at the area 0 is read out. The select signal SEL, which is outputted from the store managing circuit 243, becomes H level. The output terminal RO0 corresponds to the first group. The selector selects 1-side input according to the select signal SEL, and outputs the data d0 to the IDCT circuit 20 as the output data OUT.

Then, the address information ADO indicates the area 8, and the data d8, which is stored at the area 8, is read out. The select signal SEL, which is outputted from the store managing circuit 243, becomes H level. The output terminal RO2 corresponds to the third group. The selector 150 selects 1-side input according to the select signal SEL, and outputs the data d8 to the IDCT circuit 20 as the output data OUT.

Then, the address information ADO indicates the area 16 at the time t2, and the data d16, which is stored at the area 16, is read out. The output terminal RO4 corresponds to the fifth group, which includes the data d16. The fifth group does not include nonzero-component Therefore, the select signal SEL, which is outputted from the store managing circuit 243, becomes L level. The selector 150 selects the 0-side input according to the select signal SEL, and outputs the data zero-component data to the IDCT circuit 20 as the output data OUT.

Then, the address information ADO indicates the area 24 at the time t3, and the data d24, which is stored at the area 24, is read out. The select signal SEL, which is outputted from the store managing circuit 243, becomes H level. The output terminal RO6 corresponds to the seventh group. The selector 150 selects the 1-side input according to the select signal SEL, and outputs the data d24 to the IDCT circuit 20 as the output data OUT. The selector selects the 1-side input according to the select signal SEL for the data included in the seventh group, because it depends on the group.

Then, the address information ADO indicates the area 32 at the time t4. The output terminal RO8 corresponds to the seventh group which includes the data d32. The seventh group does not include nonzero-components. Therefore, the select signal SEL, which is outputted from the store managing circuit 243, becomes L level. The selector 150 selects the 0-side input according to the select signal SEL, and outputs the data zero-component data to the IDCT circuit 20 as the output data OUT. The same operation is performed for the area 40, 48 and 56.

The address information ADO indicates the area 1 at the time t5, and the data do, which is stored at the area 1 is read out. The select signal SEL, which is outputted from the store managing circuit 243, becomes H level. The output terminal RO0 corresponds to the first group. The selector selects the 1-side input according to the select signal SEL, and outputs the data d0 to the IDCT circuit 20 as the output data OUT.

The address information ADO indicates the area 9 at the time t6, and the data d9, which is stored at the area 9 is read out. The select signal SEL, which is outputted from the store managing circuit 243, becomes H level. The output terminal RO2 corresponds to the first group. The selector selects the 1-side input according to the select signal SEL. As described above, zero-component data is stored at the area 9. Therefore, the selector outputs zero-component data to the IDCT circuit 20 as the output data OUT.

Then, the address information ADO indicates the area 17 at the time t7, and the data d17, which is stored at the area 17 is read out. The output terminal RO4 corresponds to the fifth group which includes the data d17. The fifth group does not include nonzero-components. Therefore, the select signal SEL, which is outputted from the store managing circuit 243, becomes L level. The selector 150 selects the 0-side input according to the select signal SEL, and outputs the zero-component data to the IDCT circuit 20 as the output data OUT.

The address information ADO repeats indicating stored data. The store managing circuit 243 repeats outputting the select signal SEL corresponds to one of the plurality of groups. The selector 150 selects the 1-side or 0-side input according to the select signal SEL and outputs the data DO or zero-component data to the IDCT circuit 20 as the output data OUT.

When reading out is finished, the register of the store managing circuit is reset.

If the zero-component data and the nonzero-component data belong to the same group, the data generating circuit of the second preferred embodiment stores all data of that group. However, if nonzero-component data is not included in one group, the data generating circuit of the second preferred embodiment does not store that group. Therefore, the period for writing the data DI into the memory is shortened, the power consumption of the data generating circuit is decreased and the operation speed is improved.

The data generating circuit of the second preferred embodiment can output zero-component data if the stored data is not initialized, because the selector 150 selects zero-component data. Therefore, the data generating circuit does not have a plurality of RAMs, and the operation control of the plurality of RAMs. The data generating circuit can work without initializing all of the memory.

According to The data generating circuit of the second preferred embodiment, an area of a semiconductor chip can be reduced and flexibility of the chip layout can be improved compare to the first preferred embodiment.

One skilled in the art will appreciate that the present invention can be practiced by other than the described embodiments, which are presented for purposes of illustration and not limitation, and the present invention is limited only by the claims that follow.

What is claimed is:

1. A data generating circuit, comprising:
   a memory which writes picture data into a plurality of storage areas and reads the picture data from the plurality of storage areas according to address information;
   a register which holds storage information indicative of whether the picture data has been written into each of the plurality of storage areas;

a control circuit which outputs a select signal according to the storage information held by the register when the picture data is read from the memory; and a selector which selects an output data read from the memory or a fixed data according to the select signal output by the control circuit.

2. The data generating circuit according to claim 1, wherein the storing information corresponds to each storing area of the plurality of storing areas.

3. The data generating circuit according to claim 2, wherein the register outputs the storing information for each storing area of the plurality of storing areas according to a clock signal.

4. The data generating circuit according to claim 1, wherein the storing information corresponds to a group of storing areas of the plurality of storing areas.

5. The data generating circuit according to claim 1, further comprising a write control circuit outputting a write control signal, the write control signal controlling writing of the picture data into the memory, wherein the register starts holding the storing information according to the write control signal.

6. The data generating circuit according to claim 2, further comprising a write control circuit outputting a write control signal, the write control signal controlling writing of the picture data into the memory, wherein the register starts holding the storing information according to the write control signal.

7. The data generating circuit according to claim 3, further comprising a write control circuit outputting a write control signal, the write control signal controlling writing of the picture data into the memory, wherein the register starts holding the storing information according to the write control signal.

8. The data generating circuit according to claim 1, wherein the register is reset according to a reset signal.

9. The data generating circuit according to claim 2, wherein the register is reset according to a reset signal.

10. The data generating circuit according to claim 3, wherein the register is reset according to a reset signal.

11. The data generating circuit according to claim 5, wherein the register is reset according to a reset signal.

12. The data generating circuit according to claim 1, wherein the fixed data corresponds to a zero-component data.

13. The data generating circuit according to claim 2, wherein the fixed data corresponds to a zero-component data.

14. The data generating circuit according to claim 3, wherein the fixed data corresponds to a zero-component data.

15. The data generating circuit according to claim 5, wherein the fixed data corresponds to a zero-component data.

16. A method for generating data, comprising:

writing picture data into a plurality of storage areas of a memory;

storing information which is indicative of whether the picture data has been written into each of the plurality of storage areas;

reading the picture data from the plurality of storage areas of the memory according to address information and generating a select signal according to the information which is indicative of whether the picture data has been written into each of the plurality of storage areas; and selecting an output data read from the memory or a fixed data according to the select signal.

17. The method for data generating according to claim 16, wherein the picture data written into the storing area corresponds to a non-zero-component data.

18. The method for data generating according to claim 16, wherein the fixed data corresponds to a zero-component data.

19. The method for data generating according to claim 17, wherein the fixed data corresponds to a zero-component data.

* * * * *